US008588541B2

(12) United States Patent
Hong

(10) Patent No.: US 8,588,541 B2
(45) Date of Patent: Nov. 19, 2013

(54) METHOD AND DEVICE FOR IMAGE DEBLURRING USING JOINT BILATERAL FILTERING

(75) Inventor: Li Hong, San Diego, CA (US)

(73) Assignee: Nikon Corporation, Tokyo (JP)

(*) Notice: Subject to any disclaimer, the term of this patent is extended or adjusted under 35 U.S.C. 154(b) by 31 days.

(21) Appl. No.: 13/002,041

(22) PCT Filed: Sep. 24, 2008

(86) PCT No.: PCT/US2008/077583
§ 371 (c)(1),
(2), (4) Date: Dec. 29, 2010

(87) PCT Pub. No.: WO2010/036251
PCT Pub. Date: Apr. 1, 2010

(65) Prior Publication Data
US 2011/0110601 A1    May 12, 2011

(51) Int. Cl.
*G06K 9/40* (2006.01)
(52) U.S. Cl.
USPC ......................................................... 382/255
(58) Field of Classification Search
None
See application file for complete search history.

(56) References Cited

U.S. PATENT DOCUMENTS

| | | | |
|---|---|---|---|
| 6,927,804 B2* | 8/2005 | Adams et al. | 348/624 |
| 6,973,218 B2* | 12/2005 | Alderson et al. | 382/260 |
| 7,084,906 B2* | 8/2006 | Adams et al. | 348/222.1 |
| 7,257,271 B2* | 8/2007 | Adams et al. | 382/275 |
| 7,379,611 B2* | 5/2008 | Sun et al. | 382/254 |
| 7,692,696 B2* | 4/2010 | Steinberg et al. | 348/239 |
| 7,760,943 B2* | 7/2010 | Shaked | 382/174 |
| 7,889,949 B2* | 2/2011 | Cohen et al. | 382/299 |
| 2005/0134734 A1 | 6/2005 | Adams, Jr. et al. | |
| 2005/0220355 A1* | 10/2005 | Sun et al. | 382/254 |
| 2006/0008171 A1 | 1/2006 | Petschnigg et al. | |
| 2006/0204110 A1* | 9/2006 | Steinberg et al. | 382/224 |
| 2007/0098292 A1 | 5/2007 | Batur | |
| 2008/0025627 A1 | 1/2008 | Freeman et al. | |
| 2008/0137976 A1 | 6/2008 | Ward | |
| 2008/0192064 A1 | 8/2008 | Hong et al. | |
| 2008/0205508 A1* | 8/2008 | Ziauddin et al. | 375/240.01 |
| 2008/0309831 A1* | 12/2008 | Jung | 348/744 |

OTHER PUBLICATIONS

PCT International Report on Patentability for PCT/US2008/077583 dated Feb. 18, 2011, Nikon Corporation.
PCT International Search Report and Written Opinion for PCT/US2008/077583 dated Dec. 4, 2008, Nikon Corporation.
Johannes Kopf, M. Cohen, D. Lischinski, M. Uyttedaele, et al, Joint Bilateral Upsampling, 2007, ACM Siggraph 2007.

* cited by examiner

*Primary Examiner* — Samir Ahmed
(74) *Attorney, Agent, or Firm* — Roeder & Broder LLP

(57) ABSTRACT

A system (12) for providing an adjusted image (228) of a scene (10) from a blurred captured image (14) includes a control system (26) that provides the adjusted image (228). The control system (26) can create a downsampled blurred image (236) from the captured image (14), deblur the downsampled blurred image (236) to create a downsampled deblurred image (238), and upsample the downsampled deblurred image (238) to create the adjusted image (228). With this design, because the deblurring is performed on the downsampled blurred image (236), the computational and memory costs are substantially less than if this task is performed on the original captured image (14). Further, the control system (26) can create the adjusted image (228) using a joint bilateral filter that combines information from the blurred captured image (14) and the downsampled deblurred image (238).

10 Claims, 4 Drawing Sheets

236

238

228

METHOD AND DEVICE FOR IMAGE DEBLURRING USING JOINT BILATERAL FILTERING

BACKGROUND

Cameras are commonly used to capture an image of a scene that includes one or more objects. Unfortunately, some of the captured images are blurred. For example, movement of the camera and/or movement of the objects in the scene during the exposure time of the camera can cause blurring in the captured image.

Currently, many deblurring methods exist for reducing motion blur in the blurred image. A typical deblurring method commonly performs two tasks, namely estimation of blur point spread function ("PSF") and image deconvolution. Unfortunately, both of these tasks involve heavy computational and memory cost.

SUMMARY

The present invention is directed to a system for providing an adjusted image of a scene from a blurred, captured image. The system includes a control system. In certain embodiments, the control system is particularly useful for providing a perceptually pleasant, adjusted image. In one embodiment, the control system creates a downsampled blurred image from the captured image, deblurs the downsampled blurred image to create a downsampled deblurred image, and upsamples at least a portion of the downsampled deblurred image to create the adjusted image. With this design, because the deblurring is performed on the downsampled blurred image, the computational and memory costs are substantially less than if deblurring is performed on the original captured image.

In one embodiment, the control system upsamples the downsampled deblurred image using information from the blurred captured image and the downsampled deblurred image. For example, the control system can upsample using a joint bilateral filter that combines information from the blurred captured image and the downsampled deblurred image.

Additionally, in one embodiment, the control system deblurs the downsampled blurred image using estimated blur kernel. For example, the control system can estimate the blur point spread function ("PSF") in the downsampled blurry image (or image pairs), subsequently deblur the downsampled image, and then upsample the deblurred image to a higher resolution.

The present invention is also directed to a method for providing an adjusted image of a scene from a blurred captured image. The method can include the steps of creating a downsampled blurred image; deblurring the downsampled blurred image to create a downsampled deblurred image; and upsampling the downsampled deblurred image to create the adjusted image.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
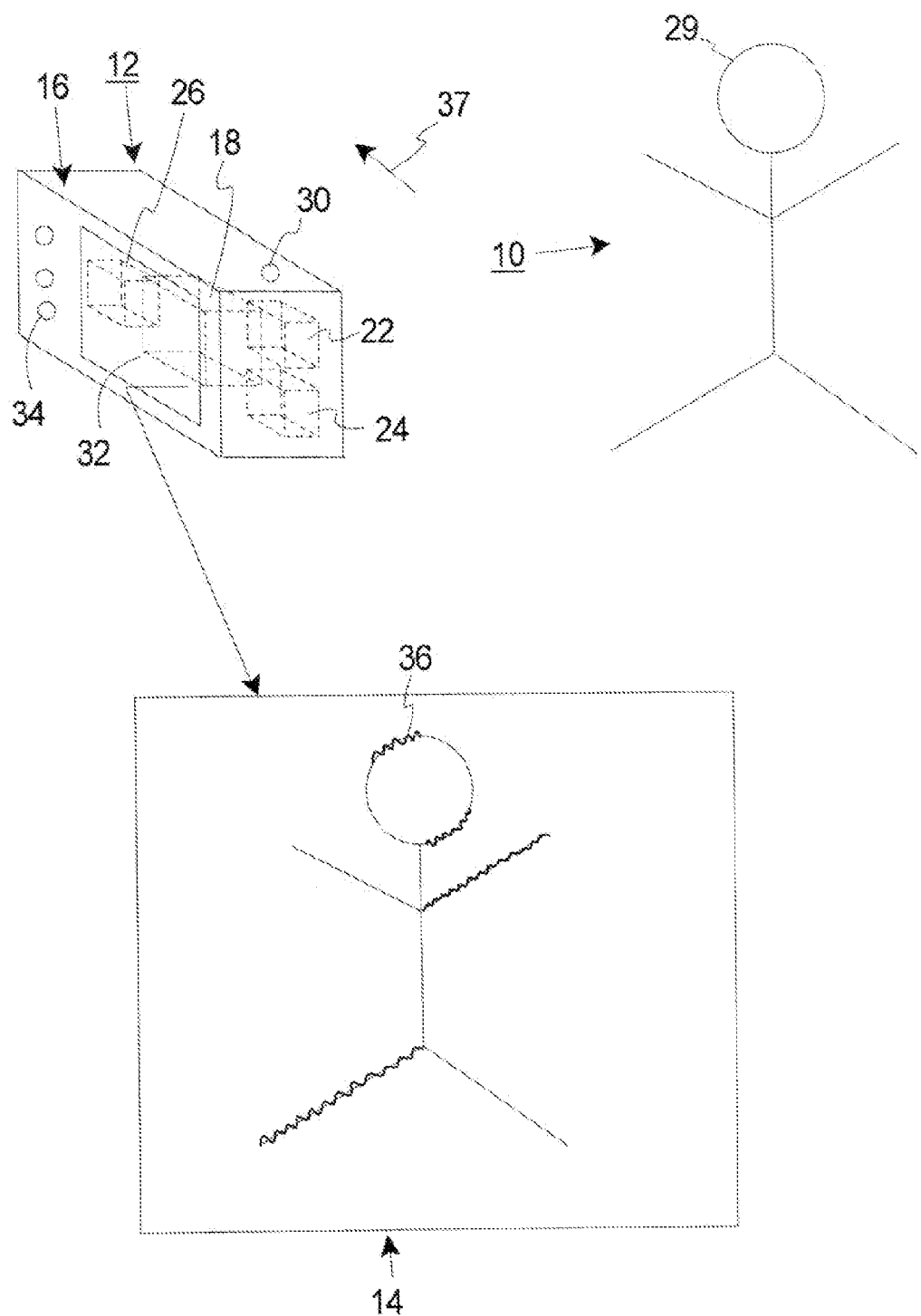
FIG. 1 is a simplified view of a scene, one embodiment of a system having features of the present invention, and a captured image.

FIG. 1 is a simplified view of a scene 10, one embodiment of a system 12 e.g. an image apparatus having features of the present invention, and a raw, blurred, captured image 14 that was captured with the image apparatus 12. In this embodiment, the image apparatus 12 is a digital camera that includes an apparatus frame 16, an optical assembly (not shown), a capturing system 18 (illustrated as a box in phantom), a power source 22 (illustrated as a box in phantom), an illumination system (not shown), a storage assembly 24 (illustrated as a box in phantom), and a control system 26 (illustrated as a box in phantom). The design of these components can be varied to suit the design requirements and type of image apparatus 12. Further, the image apparatus 12 could be designed without one or more of these components. For example, the image apparatus 12 could be designed without the illumination system.

As an overview, in certain embodiments, the control system 26 provided herein can provide a relatively high resolution, low blur adjusted image 228 (illustrated in FIG. 2C) from the captured image 14 with simpler calculations and less memory requirements. In certain embodiments, the basic idea is to downsample the captured image, perform deblurring on the downsampled image, and upsample the downsampled deblurred image to provide the adjusted image 228.

The type of scene 10 captured by the image apparatus 12 can vary. For example, the scene 10 can include features such as one or more animals, plants, mammals, fish, objects, and/or environments. In FIG. 1, the scene 10 includes a simple stick FIG. 29 of a person.

The apparatus frame 16 can be rigid and support at least some of the other components of the image apparatus 12. In one embodiment, the apparatus frame 16 defines a cavity that receives and retains at least a portion of the capturing system 18, the power source 22, the illumination system, the storage assembly 24, and the control system 26. Further, the optical assembly is fixedly secured to the apparatus frame 16.

The image apparatus 12 can include an aperture (not shown) and a shutter mechanism (not shown) that work together to control the amount of light that reaches the capturing system 18. The shutter mechanism can include a pair of blinds that work in conjunction with each other to allow the light to be focused on the capturing system 18 for a certain amount of time. Alternatively, for example, the shutter mechanism can be all electronic and contain no moving parts. For example, an electronic capturing system can have a capture time controlled electronically to emulate the functionality of the blinds. The time in which the shutter mechanism allows light to be focused on the capturing system 18 is commonly referred to as the capture time or the exposure time. The length of the exposure time can vary. The shutter mechanism is activated by a shutter button 30.

The optical assembly can include a single lens or a combination of lenses that work in conjunction with each other to focus light onto the capturing system 18.

In one embodiment, the image apparatus 12 includes an autofocus assembly (not shown) including one or more lens movers that move one or more lenses of the optical assembly in or out to focus the light on the capturing system 18.

The capturing system 18 captures the captured image 14 during the exposure time. The design of the capturing system 18 can vary according to the type of image apparatus 12. For a digital type camera, the capturing system 18 includes an image sensor (not shown), and a filter assembly (not shown) e.g. a Bayer filter.

The image sensor receives the light that passes through the aperture and converts the light into electricity. One non-exclusive example of an image sensor for digital cameras is known as a charge coupled device ("CCD"). An alternative image sensor 28 that may be employed in digital cameras uses complementary metal oxide semiconductor ("CMOS") technology. Each of these image sensors includes a plurality of pixels.

The power source 22 provides electrical power to the electrical components of the image apparatus 12. For example, the power source 22 can include one or more batteries.

The storage assembly 24 stores the various captured images 14 and/or the adjusted images 228. The storage assembly 24 can be fixedly or removable coupled to the apparatus frame 16. Non-exclusive examples of suitable storage assemblies 24 include flash memory, a floppy disk, a hard disk, or a writeable CD or DVD.

The control system 26 is electrically connected to and controls the operation of the electrical components of the image apparatus 12. The control system 26 can include one or more processors and circuits and the control system 26 can be programmed to perform one or more of the functions described herein.

In certain embodiments, the control system 26 provides the adjusted image 228 using a digital deblurring algorithm to reduce the blur from the captured image 14. The image blur reduction algorithm is described in more detail below.

Additionally, the image apparatus 12 can include an image display 32 that displays the captured image 14 and/or the adjusted image 228. Additionally, the image display 32 can display other information such as the time of day, and the date. Moreover, the image apparatus 12 can include one or more control switches 34 electrically connected to the control system 26 that allows the user to control the functions of the image apparatus 12.

One or more of the control switches 34 can be used to selectively activate the deblurring compensation described herein. Alternatively, the control system 26 can evaluate the captured image 14 or the environmental conditions and the control system 26 can determine when to activate the image deblurring compensation described herein.

FIG. 1 includes a simplified illustration of the raw, captured image 14 (illustrated away from the image apparatus 10) that can be blurred 36 (illustrated as a thicker, wavy line). It should be noted that movement of the image apparatus 12 and/or movement of the object(s) 29 in the scene 12 during the capturing of the blurred image 14 can cause motion blur 36 in the blurred image 14. For example, in FIG. 1, the image apparatus 10 was moved along a motion direction 37 (illustrated as an arrow) during the exposure time while capturing the blurred image 14. As a result thereof, the blurred image 14 has blur 36 that corresponds to the motion direction 37.

Figure 2A:
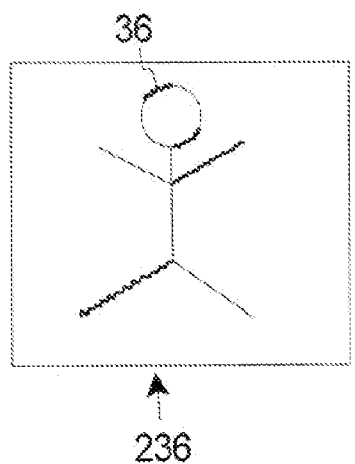
FIG. 2A is a simplified illustration of a downsampled blurred image.

FIG. 2A is a simplified illustration of a downsampled blurred image 236 that was computed and generated from the blurred captured image 14 with the control system 26 (illustrated in FIG. 1) using any suitable downsampling technique. In non-exclusive examples, the downsampled blurred image 236 can have approximately 0.75, 0.5, 0.25, or 0.2 percent of the resolution of the captured image 14. One non-exclusive example of a suitable, conventional downsampling technique is bicubic.

Figure 2B:
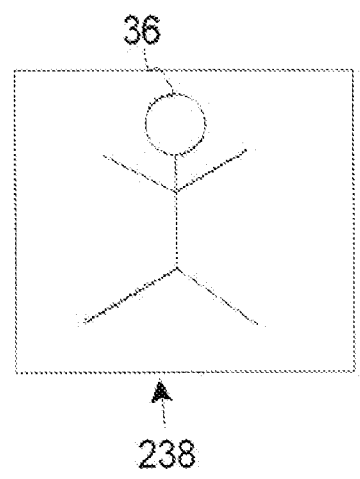
FIG. 2B is a simplified illustration of a downsampled deblurred image.

FIG. 2B is a simplified illustration of a downsampled deblurred image 238 that was obtained from deblurring of the downsampled blurred image 236 (illustrated in FIG. 2A). For example, the control system 26 (illustrated in FIG. 1) can estimate the blur point spread function ("PSF") and perform image deconvolution on the downsampled blurred image 236. Further, deconvolution can be performed using Lucy-Richardson deconvolution, for example.

Because the deblurring is performed on the downsampled, lower resolution, blurred image 238, the computational and memory costs are substantially less than if deblurring was performed on the original, higher resolution captured image 14.

Comparing the downsampled blurred image 236 (illustrated in FIG. 2A) with the downsampled deblurred image 238 (illustrated in FIG. 2B), the downsampled deblurred image 238 has significantly less blurring 36 than the downsampled blurred image 236.

Figure 2C:
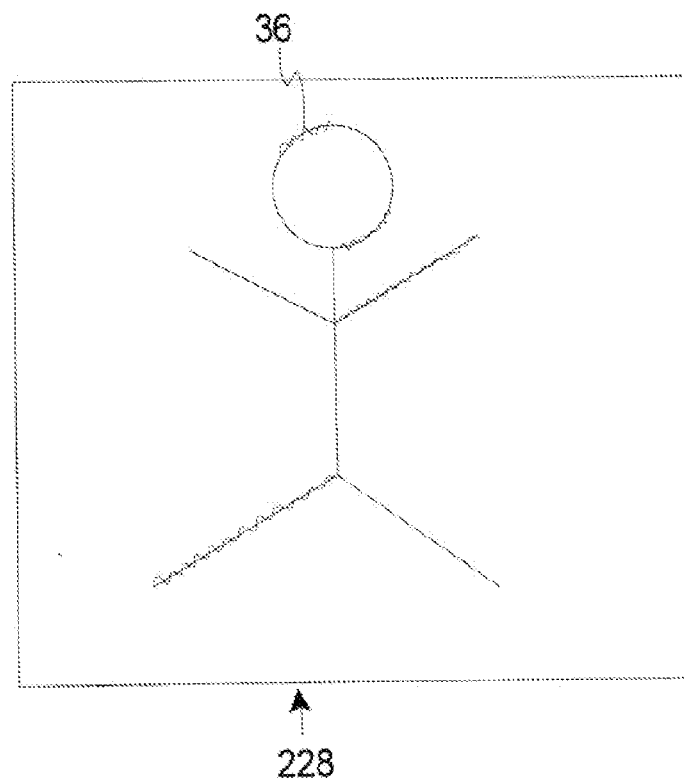
FIG. 2C is a simplified illustration of an adjusted image from the captured image.

Further, FIG. 2C is a simplified illustration of the adjusted image 228 that was generated by the control system (illustrated in FIG. 1) with information from both the downsampled deblurred image 238 (illustrated in FIG. 2B) and the captured image 14 (illustrated in FIG. 1). For example, the control system 14 can upsample using a joint bilateral filter that combines information from the blurred captured image 14 and the downsampled deblurred image 238. A suitable joint, bilateral filter is represented in Equation 1 below:

$$S(x \mid S_d(x\downarrow); B) = \frac{1}{C(X)} \sum_{x' \downarrow \in N(x\downarrow)} G_{spatil\_distance}(x\downarrow - x'\downarrow) \qquad \text{Eq. 1}$$

$$G_{Intensity\_distance}(B(x) - B(x')) * S_d(x'\downarrow).$$

In Equation 1, (i) B is the blurred original captured image 14; (ii) $S_d$ is downsampled deblurred image 238; (iii) S is the final, adjusted image 228 provided by the control system 14; (iv) C is normalization coefficient; (v) N(x) is a small neighborhood of pixel x; (vi) G is a Gaussian function; (vii) x denotes the pixel coordinate in the upsampled image; (viii) x' denotes a neighboring pixel to pixel x; and (ix) x↓, x'↓, denote the corresponding coordinates in the downsampled deblurred image $S_d$. The normalization coefficient is the scale that makes the sum of the filter coefficients equal to one.

The joint, bilateral filter disclosed in Equation 1 can be used by the control system 26 to accurately blend the blurred original captured image 14 and the downsampled deblurred image 238 to generate the adjusted image 228.

Comparing the adjusted image 228 from FIG. 2C with the captured image 14, the adjusted image 228 has significantly reduced blurring 36 than the captured image 14.

Figure 3:
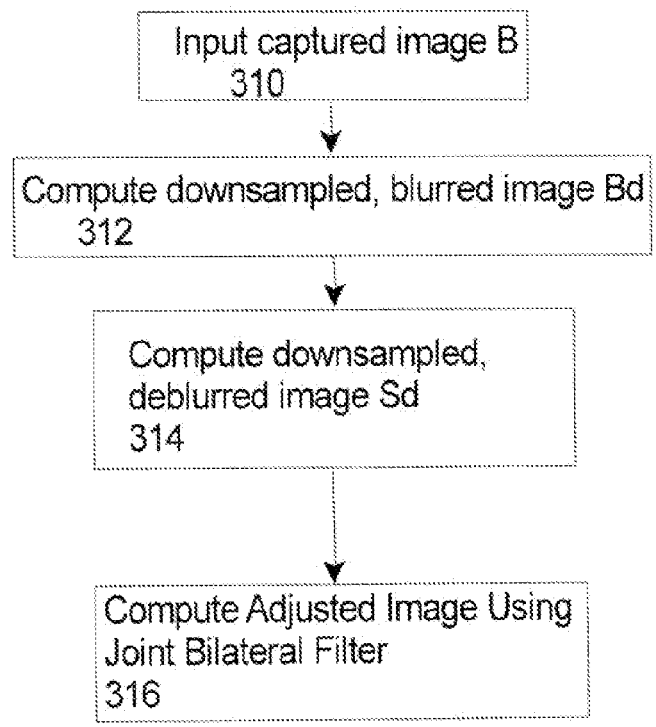
FIG. 3 is a flow chart that illustrates one version of a digital blur reduction approach.

FIG. 3 is a flow chart that illustrates one method that can be used to provide the adjusted image from the captured image. At block 310, the blurred captured image B is input into the control system. Next, at block 312, the downsampled blurred image $B_d$ is computed by the control system from the captured image using conventional downsampling techniques. Subsequently, at block 314, the downsampled deblurred image $S_d$ is computed by the control system by estimating the blur PSF and subsequently performing deconvolution. Next, at block 316, the adjusted image is created using the joint, bilateral filter on the captured image B and the downsampled deblurred image $S_d$.

Figure 4:
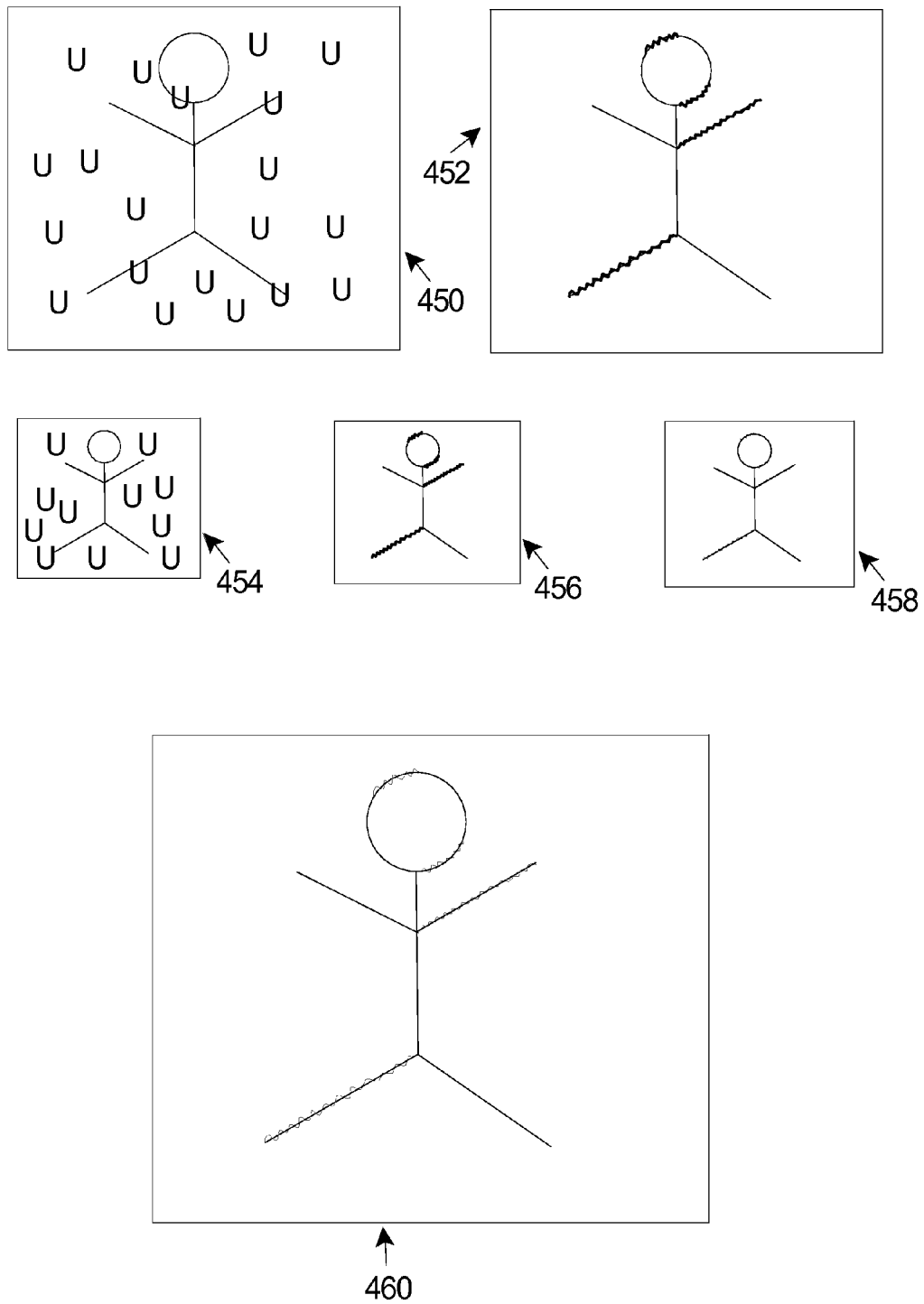
FIG. 4 is a simplified illustration of a plurality of images that facilitate explanation of another method for digital blur reduction.

FIG. 4 is a simplified illustration of a plurality of images that facilitate explanation of another method for digital blur reduction. In this embodiment, in low light situations, the image apparatus (not shown in FIG. 4) captures a first captured image 450 and a second captured image 452 of the scene (not shown in FIG. 4) in rapid succession (e.g. within approximately 0.05, 0.2, 0.5, or one second of each other as a non-exclusive examples). Because the images 450, 452 are captured in rapid succession, there is less chance for the movement of objects in the scene or movement of the camera. In certain embodiments, one of the captured images 450, 452 is an underexposed, low resolution image and the other one of the captured images 452, 450 is a normally exposed, high resolution blurred image. In FIG. 4, the first captured image 450 is the underexposed, low resolution image (includes "U's" to represent the underexposure), and the second captured image 452 is the normally exposed, high resolution blurred image (includes a thicker, wavy line to represent the blurring). In this example, because the first captured image 450 is underexposed, there is less blurring in this image (than the second captured image 452) because there was less time for movement of the object(s) in the scene and/or camera movements.

Stated in another fashion, in one embodiment, the second captured image 452 can be properly exposed and the first captured image 450 can be underexposed for the existing lighting conditions of the scene. Thus, the first captured image 450 has a time that is relatively short for the existing lighting conditions of the scene. This reduces the likelihood of motion blur in the first captured image 450 in low light scenarios. In non-exclusive, alternative examples, the first captured image 450 can be less than approximately 40, 50, 60, 70, 80, or 90 percent exposed and the exposure time is less than approximately 40, 50, 60, 70, 80, or 90 percent of the exposure time for the second captured image 452. For example, depending upon the lighting conditions, the exposure time for the second captured image 452 can be approximately 1/10, 1/20 or 1/30 of a second, and the exposure time for the first captured image 450 can be approximately 1/40, 1/50, 1/60 or 1/80 of a second. However, other exposure times can be utilized.

Next, the control system (not shown in FIG. 4) downsamples the underexposed first captured image 450 to create a downsampled underexposed image 454; and the control system downsamples the normally exposed second captured image 452 to create a downsampled blurred image 456.

Subsequently, the control system combines information from the downsampled underexposed image 454 and the downsampled blurred image 456 to create a downsampled, deblurred image 458. This can be done by estimating the point spread function from the downsampled underexposed image 454 and downsampled blurred image 456. Next, the estimated PSF is used to deblur downsampled blurred image.

Next, the control system generates an adjusted image 460 with information from both the downsampled, deblurred image 458 and one or both of the captured images 450, 452. For example, the control system can upsample using a joint bilateral filter that combines information from the downsampled, deblurred image 458, and the high resolution, under-exposed first captured image 450. A suitable joint, bilateral filter is represented in Equation 2 below:

$$S(x \mid S_d(x\downarrow); B) = \frac{1}{C(X)} \sum_{x'\downarrow \in N(x\downarrow)} G_{spatil\_distance}(x\downarrow - x'\downarrow) \quad \text{Eq. 2}$$
$$G_{Intensity\_distance}(B(x) - B(x')) * S_d(x'\downarrow).$$

In Equation 2, (i) B1 is the first captured image 450; (iii) $S_d$ is downsampled deblurred image 458; (iv) S is the final, adjusted image 460 provided by the control system; (v) C is a normalization coefficient; (vi) N(x) is a smaller neighborhood of pixel x; (vii) G is a Gaussian function; (viii) x denotes the pixel coordinate in the upsampled image; (ix) x' denotes a neighboring pixel to pixel x; and (x) x↓, x'↓, denote the corresponding coordinates in the downsampled deblurred image $S_d$.

The joint, bilateral filter disclosed in Equation 2 can be used by the control system to accurately blend the underexposed, captured image 450 and the downsampled deblurred image 458 to generate the adjusted image 460.

Figure 5:
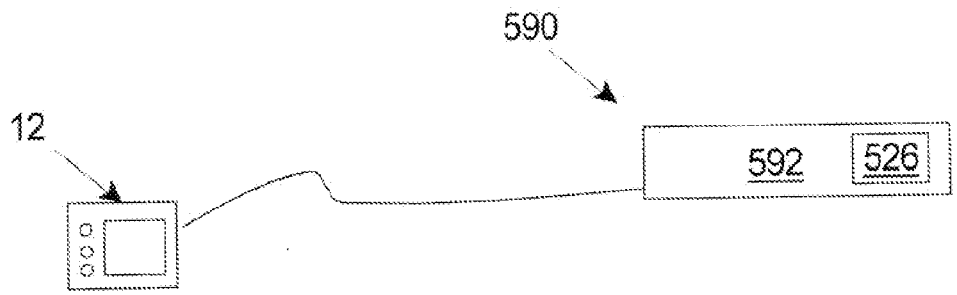
FIG. 5 is a simplified illustration of another system having features of the present invention.

FIG. 5 illustrates another embodiment of a system 590 having features of the present invention. In this embodiment, the system 590 includes a computer 592 that is electrically connected to the image apparatus 12. Further, in this embodiment, one or more of the captured images (not shown in FIG. 5) captured by the image apparatus 12 can be transferred from the computer 592. With this design, a control system 526 of the computer 592 can produce the adjusted image (not shown in FIG. 5) using the one of the deblurring methods described above. Alternatively, for example, the image apparatus 12 can be connected to the computer 592 in a wireless fashion.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A system for providing an adjusted image of a scene from a blurred captured image, the system comprising:
a control system including a processor, wherein the control system creates a downsampled blurred image from the blurred captured image, deblurs the downsampled blurred image to create a downsampled deblurred image, and upsamples the downsampled deblurred image to create the adjusted image, using a joint bilateral filter that combines information from the blurred captured image and the downsampled deblurred image; wherein the joint bilateral filter can be expressed as follows:

$$S(x \mid S_d(x\downarrow); B) = \frac{1}{C(X)}$$
$$\sum_{x'\downarrow \in N(x\downarrow)} G_{spatil\_distance}(x\downarrow - x'\downarrow) G_{Intensity\_distance}(B(x) - B(x')) * S_d(x'\downarrow)$$

wherein (i) B is the captured image; (ii) Sd is downsampled deblurred image; (iii) S is the final, adjusted image; (iv) C is a normalization coefficient; (v) N(x) is a small neighborhood of a pixel x; (vi) G is a Gaussian function; (vii) x denotes the pixel coordinate in the upsampled adjusted image; (viii) x' denotes a neighboring pixel to pixel x; and (ix) x↓, x'↓ denote the corresponding coordinates in the downsampled deblurr image Sd.

2. The system of claim 1 wherein the control system estimates a point spread function and deconvolutes the downsampled blurred image using the estimated point spread function.

3. A system for providing an adjusted image of a scene from a first blurred captured image of the scene and a second captured image of the scene, the system comprising:

a control system including a processor, wherein the control system creates a first downsampled blurred image from the first blurred captured image, creates a second downsampled from the second captured image, provides a downsampled deblurred image from the first downsampled blurred image and the second downsampled image, and upsamples the downsampled deblurred image to create the adjusted image, using a joint bilateral filter that combines information from one of the captured images and the downsampled deblurred image; wherein the joint bilateral filter can be expressed as follows:

$$S(x \mid S_d(x\downarrow); B) = \frac{1}{C(X)}$$
$$\sum_{x'\downarrow \in N(x\downarrow)} G_{spatil\_distance}(x\downarrow - x'\downarrow) G_{Intensity\_distance}(B(x) - B(x')) * S_d(x'\downarrow)$$

wherein (i) B is the captured image; (ii) Sd is downsampled deblurred image; (iii) S is the final, adjusted image; (iv) C is a normalization coefficient; (v) N(x) is a small neighborhood of a pixel x; (vi) G is a Gaussian function; (vii) x denotes the pixel coordinate in the upsampled adjusted image; (viii) x' denotes a neighboring pixel to pixel x; and (ix) x↓, x'↓ denote the corresponding coordinates in the downsampled deblurr image Sd.

4. The system of claim 3 wherein the first blurred captured image is properly exposed and the second captured image is properly underexposed.

5. The system of claim 3 wherein the control system estimates a point spread function and deconvolutes the first downsampled blurred image using the estimated point spread function.

6. A system for providing an adjusted image of a scene from a blurred captured image, the system comprising:

a control system including a processor, wherein the control system (i) creates a downsampled blurred image from the blurred captured image, (ii) deblurs the downsampled blurred image to create a downsampled deblurred image, and (iii) upsamples the downsampled deblurred image using a joint bilateral filter that combines information from the blurred captured image and the downsampled deblurred image to create the adjusted image.

7. The system of claim 6 wherein the control system estimates a point spread function and deconvolutes the downsampled blurred image using the estimated point spread function.

8. A system for providing an adjusted image of a scene from a first blurred captured image of the scene and a second captured image of the scene, the system comprising:

a control system including a processor, wherein the control system (i) creates a first downsampled blurred image from the first blurred captured image, (ii) creates a second downsampled image from the second captured image, (iii) provides a downsampled deblurred image from the first downsampled blurred image and the second downsampled image, and (iv) upsamples the downsampled deblurred image using a joint bilateral filter that combines information from one of the captured images and the downsampled deblurred image to create the adjusted image.

9. The system of claim 8 wherein the control system estimates a point spread function and deconvolutes the first downsampled blurred image using the estimated point spread function.

10. The system of claim 8 wherein the first blurred captured image is properly exposed and the second captured image is properly underexposed.

* * * * *